United States Patent Office 3,552,173
Patented Jan. 5, 1971

3,552,173
ARRANGEMENT FOR THE EXTRUSION OF TUBULAR ELEMENTS FABRICATED BY MEANS OF A PRESS AND ALSO THE PRESSES USED TO OBTAIN THESE ELEMENTS
Oreste Biginelli, Rue Buffon, Clermont-Ferrand, France
Filed Dec. 22, 1967, Ser. No. 692,920
Claims priority, application France, Jan. 12, 1967, 90,986
Int. Cl. B21c 35/00
U.S. Cl. 72—257                                   4 Claims

ABSTRACT OF THE DISCLOSURE

A die-forming press for forming a tubular object having a bottom comprises a hollow cylindrical die closed at one end and comprising a forming chamber at the closed end and a guiding sleeve portion extending beyond the forming chamber a distance greater than the depth of the forming chamber. A punch tool movable into the die has a head portion of smaller cross-section and a guiding portion extending rearwardly of the head and fitting closely in the guiding sleeve portion of the die. The guiding portion of the punch tool enters the guiding sleeve portion of the die before pressure engagement of the head of the punch with the material to be formed to assure correct positioning of the head portion relative to the die cavity. The guiding portion of the punch tool has axially extending grooves to receive corresponding projections of an extraction ring for removing the formed object from the punch tool.

---

The present invention relates to a die-forming press for forming from a block of material a tubular object having a bottom.

There exist already extrusion presses for the production of tubular elements obtained by means of a block or mass of metal. In these presses it is also usual to guide the punch tool during its active stroke by means of the walls of the die. The tool is being provided with an accurately machined surface which does not come into contact with the element to be extruded. This section slides in the bored out section of the die, the tolerance between these parts being very close.

The processes existing up to now, present a major inconvenience, i.e. the guiding of the punch tool by means of the bored walls of the die does not allow the positioning of an extraction ring on the punch, the diameter of the drawn out element being less than or equal to the diameter of the punch tool.

The extrusion arrangement existing on the type of press described above consists of a piston which is submitted to either a hydraulic or mechanical force exerted on the axis of the extrusion tool which by means of its head section produces the unextruded object such as a gobelet which consequently caps the tool.

Such an extrusion arrangement is represented in FIG. 1 in which shows the punch tool 11; the extruder 12; and the extruded object 13; the die 14 which corresponds with the punch tool 17.

Extrusion arrangements such as these present numerous difficulties and in particular the following:

(1) When the gobelet is manufactured with a thin bottom and particularly of a material with an aluminium alloy base, there is a major risk of tearing or scraping the bottom part of the tubular element when it is submitted to the pressure of the front surface of the extrusion tool 12. In any case, the extrusion piston 12 scrapes the bottom of the gobelet leaving a mark. Such punch tools and extrusion pistons have an irregular operation for extrusion operations at temperatures exceeding 700°. The extruder and punch tool head may not be internally cooled during the operation because of the lack of material between the extrusion piston 12 and the punch tool 11.

In such arrangements the working surface of the extrusion piston and the drawing out tool is not sufficiently great to function under good conditions.

It is practically impossible to provide a punch tool with a replaceable wear head because of the passage of the extrusion piston through its center section.

Following the extrusion operation and when the head of the punch tool and the front surface of the extrusion piston are in contact with the metal to be extruded there often occurs an injection of the metal into the circular section between the extruder and the punch which produces excessive extrusion pressures and consequently a defective surface on the walls of the gobelet (traces of scraping metal tear and a tendency to block the head of the extrusion piston in the locating head of the punch tool by the metal particles.

The purpose of this invention is to resolve these problems, and to this effect it deals with an extrusion arrangement for tubular objects which are formed on a press comprising a punch tool, having a head section which comes in contact with the block of metal to be extruded and also having an extrusion section which slides in the bored-out die sleeve. This is an arrangement in which the guided section of the punch tool is provided with grooves between projections which slide in the cylindrical bored section of the die. These grooves work in cooperation with the annular ring which contains corresponding inverse grooves coinciding with those of the punch tool, in such a manner that, when the punch tool has been withdrawn after extrusion, the formed element which is in contact with the tool bears upon the projecting sections of the ring grooves. This is fixed, thus allowing the withdrawal of the tool after extrusion and avoiding the scraping or deformation of the extruded object.

Other purposes or advantages will be borne out by the description, claims and accompanying drawings in which:

Figure 1:
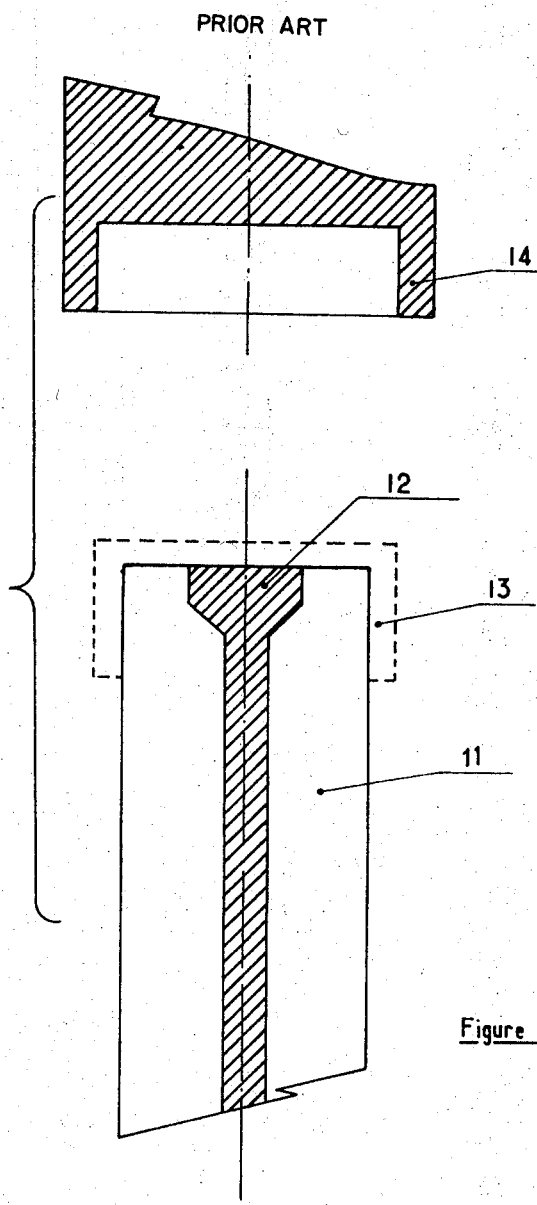
FIG. 1 is a sectional view of a prior art extrusion press.
Figure 2:
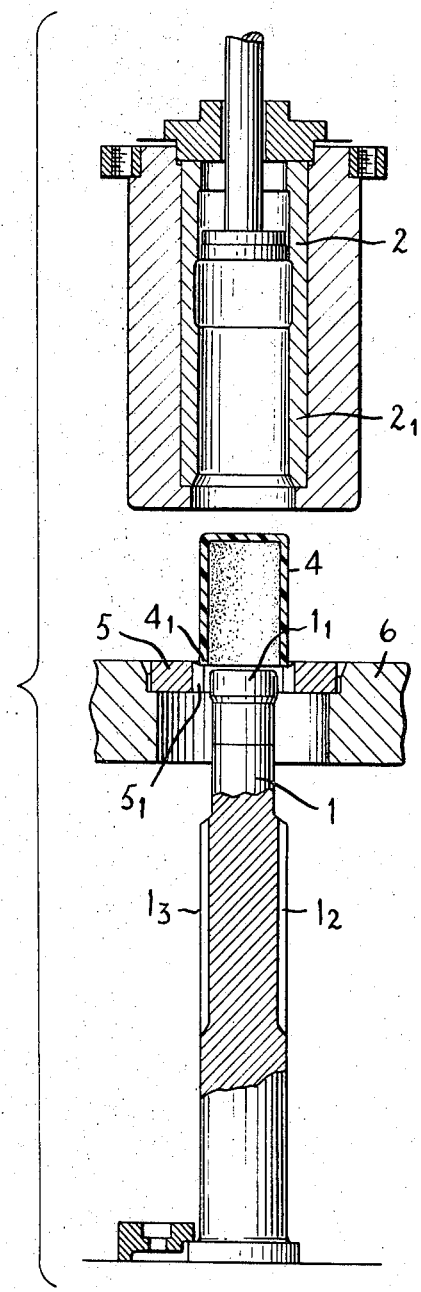
FIGS. 2 and 3 are sectional views of an extrusion press in accordance with the present invention showing the two extreme positions of the extrusion punch in relation to the die.
Figure 3:
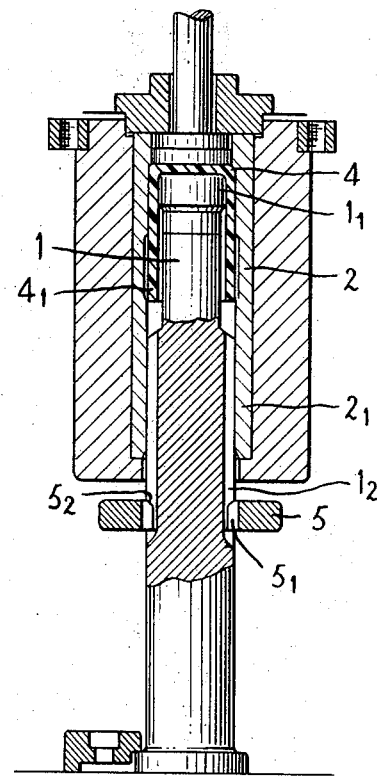

In accordance with the invention and as is shown in FIGS. 2 to 5, the extrusion press comprises a punch tool 1 which is guided through the guiding portion $2_1$ of the die 2. The punch tool comprises a head section $1_1$ which comes in contact with the block of metal 3 which ultimately makes up the gobelet or tubular bottomed element 4.

The length of the head $1_1$ is determined according to the element 4 to be extruded. Following the head section of the punch which comes in contact with the block of metal to be formed, there is formed a guide section $1_3$ which slides in the upper part of the guiding sleeve $2_1$, this sleeve having the same diameter with close tolerances. The guide section $1_3$ of the punch tool is provided with a series of longitudinal grooves $1_2$.

Thus, during the extrusion stroke the punch 1 is guided by means of the die sleeve $2_1$. The summits of the grooved sections are carefully machined in order to slide accurately in the guiding part $2_1$ of the sleeve section of the die.

The extrusion punch tool works in co-ordination with the extraction ring 5 containing projections $5_1$ which may slide in the grooved sections $1_2$ which are formed on the punch.

The extraction ring 5 is immobilised during the removal of the tubular element 4 by means of a fixed block 6 which is located on the shaft of the punch 1 at a point sufficiently distant from the die mouth. Therefore at the end of the extrusion cycle the tubular elements manufactured may be withdrawn between the die mouth and the extrusion ring 5.

Thanks to this annular extractor the guiding section $1_3$ of the punch tool 1 and the head $1_1$ presents a maximum surface area which provides precision extruding without risk of eccentricity of the tubular elements.

Figure 4:
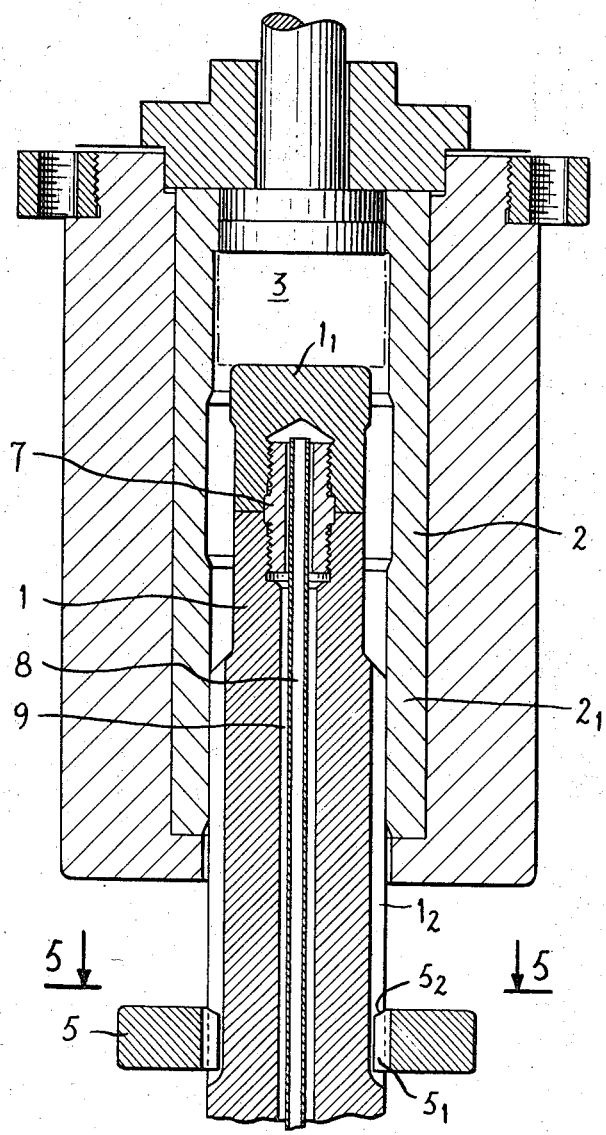
FIG. 4 is a larger scale sectional view of the punch tool complete with its replaceable wear head and cooling channel.
Figure 5:
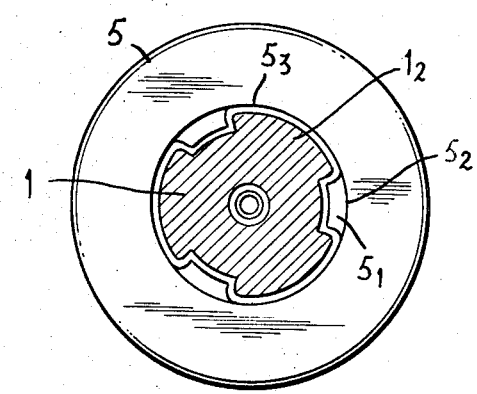
FIG. 5 is a sectional view of FIG. 4, on the line 5—5, and shows the guide section of the punch tool in relation to the extraction ring of the press.

As is represented in FIG. 4 the punch head $1_1$ has the form of a replacable wear piece.

To this effect it is fixed to the punch tool body 1 by means of a centering pin 7.

The arrangement of the extraction ring which is located outside the diameter of the guided section $1_3$ of the punch tool allows the axial boring of the punch tool and its head in order to produce an internal canal 8 in which the cooling agent may be circulated, for example water, which is evacuated between the outer face of the channel 8 and the bored out section 9 of the punch tool.

In the example shown in FIG. 4 the guiding section $1_3$ of the punch tool 1 contains three grooves $1_2$ in which the three sections $5_1$ of the extracter ring 5 travel. During the extrusion operation the edges $4_1$ of the tubular element come in contact with the extracter ring.

An extrusion cycle takes place as follows:

A block of metal 3 is centered in the annular throat $5_2$ which is formed at the level of the sectors $5_1$ of the extracter ring 5. The punch tool during its travel towards the die carries the block into the sleeve 2 of the die until it has reached the bottom of the forming cavity of the die. It will be seen that the guiding section $1_3$ of the punch tool 1 enters the guiding sleeve portion $2_1$ of the die as seen in FIG. 4 before the actual extruding operation begins. The punch tool is thereby guided accurately into the forming chamber of the die.

The punch tool during its movement towards the bottom of the die passes through the sectors $5_1$ of the extraction ring which slide in the grooves $1_2$ of the punch tool.

After extrusion and during the withdrawal movement of the punch the tubular element 4 which has been formed caps the head of the punch tool.

During the return movement of the punch the edge $4_1$ of the tubular element 4 is forced against the sectors $5_1$ of the extraction ring 5 which is held immobile by means of the fixed block 6, while the punch tool continues its withdrawal from the tubular element 4.

On completion of the punch tool 1 stroke, the finished tubular element 4 is withdrawn from the press between the opening of the die and the extraction ring 5.

As should be understood, the invention is not limited to the means of manufacture described above and shown in the accompanying sketches, but may be extended to include other types and means of manufacture without exceeding the limits of the invention, for example the number of sectors $5_1$ of the extraction ring and the grooves formed in the piston and die sleeve are not limited to three.

What I claim is:

1. A die forming press for forming a tubular object having a bottom, said press comprising a hollow cylindrical die closed at one end and open at the other end, said die comprising a forming chamber at the closed end of the die and a guiding sleeve portion extending beyond said forming chamber in a direction away from the closed end of the die a distance greater than the depth of said forming chamber, a punch tool movable into said die and comprising a head portion engageable with the material to be formed, a stem portion and a guiding portion, said head portion entering said forming chamber and having a cross-section smaller than the internal cross-section of said die, said guiding portion of said tool fitting closely in the guiding sleeve portion of said die and entering said guiding sleeve portion before pressure engagement of said head portion with the material to be formed to guide said tool accurately in said die during a forming operation, said guiding portion of said tool having longitudinally extending circumferentially spaced grooves in its periphery, and an extraction ring encircling said tool and having inwardly extending projections which slide in said grooves in the guiding portion of said tool, and means for holding said extraction ring stationary when said tool is withdrawn from said die after formation of said object, whereupon said extraction ring is engageable with said object to remove it from said tool.

2. A die forming press according to claim 1, in which said extraction ring has on its front face facing said die a circular throat for receiving and centering a block of material to be formed in said press, before said block is guided by said punch tool into the die opening.

3. A die forming press according to claim 1, in which said head portion of said punch tool comprises a separate piece replacably secured to said stem portion by a connecting pin, said tool having an axial channel for cooling fluid and said connecting pin being hollow to admit said cooling fluid to said head portion.

4. A die forming press according to claim 1, in which the width of said grooves in the guiding portion of said tool is at least half the distance between successive grooves.

References Cited

UNITED STATES PATENTS

| | | | |
|---|---|---|---|
| 619,747 | 2/1899 | Holinger | 72—257X |
| 3,165,203 | 1/1965 | Dom | 72—257X |
| 3,295,351 | 1/1967 | Jacobs | 72—344 |
| 2,740,519 | 4/1956 | Sparks | 72—254 |
| 2,849,788 | 9/1958 | Creek | 29—156.8 |

FOREIGN PATENTS 880,038  12/1942  France.

CHARLES W. LANHAM, Primary Examiner

A. L. HAVIS, Assistant Examiner

U.S. Cl. X.R.

72—267, 273